Jan. 12, 1954

P. GILBERT 2,665,846

ELECTRONIC COUNTING DEVICE

Filed March 12, 1951

INVENTOR.
PHILIP GILBERT
BY Alfred W Petchaft
ATTORNEY

FIG. 3A.

INVENTOR.
PHILIP GILBERT
BY Alfred W Petchaft
ATTORNEY

Jan. 12, 1954  P. GILBERT  2,665,846
ELECTRONIC COUNTING DEVICE
Filed March 12, 1951
5 Sheets-Sheet 4

INVENTOR.
PHILIP GILBERT
BY Alfred W. Petshaft
ATTORNEY

Jan. 12, 1954   P. GILBERT   2,665,846
ELECTRONIC COUNTING DEVICE
Filed March 12, 1951   5 Sheets-Sheet 5

FIG. 6.

INVENTOR.
PHILIP GILBERT
BY [signature]
ATTORNEY

Patented Jan. 12, 1954

2,665,846

UNITED STATES PATENT OFFICE 2,665,846

ELECTRONIC COUNTING DEVICE

Philip Gilbert, Ferguson, Mo., assignor to Universal Match Corporation, St. Louis, Mo., a corporation of Delaware Application March 12, 1951, Serial No. 215,175

19 Claims. (Cl. 235—132)

This invention relates in general to certain new and useful improvements in electronic counting devices and, more particularly, to a counting device capable of counting directly by units and tens in decimal order.

In many diverse and different types of situations, it is necessary to determine the total quantity of a given physical effect, phenomenon, or factor. For example, in photographic work, it is highly desirable to measure the volume of light which falls upon the given object. This problem is frequently encountered in making photographic exposures both in printing from already finished negatives, as well as in exposing the negatives in a camera in the first instance. The problem in photographic work is particularly critical because precise results cannot be photographically reproduced with sufficient accuracy for commercial activities unless it is possible to know that an almost exact and reproducible quantity of light can be employed in making the exposure. Since photographic lights are energized electrically and electric potential fluctuates from moment to moment the intensity of the light will vary or fluctuate during any period of exposure. It is, therefore, not possible to obtain precise photographic exposures through the use of a timer, however accurate, inasmuch as relatively small voltage fluctuations result in illumination fluctuations of much greater magnitude, which, in turn, results in negative density variations of comparably great magnitude.

It is, of course, not only necessary to measure the volume of light during the exposure, but it is also necessary to integrate the intensity of the light in terms of time so that the result may be employed to produce some useful result, such as, for example, tripping a relay which will close the shutter of the camera or in some other way mechanically terminate the exposure at the end of the given period. To be more specific, suppose that in making photographic plates, it is desirable to expose a plate to a given quantity of light for a predetermined period the operator will, of course, know what amount of exposure is desired having determined this amount either by observation or by previous experiments in which the exposure was too great or too small. It, therefore, becomes necessary for the operator to be able to set an exposure determining device to the amount of exposure desired, so that when the amount of exposure, that is to say, the integral of intensity in terms of time, has been reached the exposure will be automatically terminated.

Although heretofore many efforts have been made to provide electronic integrators, which will initiate some mechanical action at the conclusion of a pre-set count, such integrators or counters, have been unreliable and inaccurate, as when, for example, they are pre-set by moving a pointer over a dial which both introduces parallax and relies upon the accuracy of the memory of the operator to reset them to the same result, or which are not capable of having the desired result set up directly in the desired number, but must, instead, employ some arbitrary reciprocal or compensating series of digits. Such expedients, of course, apart from reliability and accuracy, are extremely difficult to use and require a skill far beyond that of the ordinary user.

It is, therefore, one of the primary objects of the present invention to provide an integrating electronic counter which is relatively simple in construction and highly reliable in operation and which can be employed to initiate some mechanical result when a predetermined count has been reached.

It is another object of the present invention to provide an electronic counter of the type stated which can be set to some predetermined count so as to be capable of initiating a mechanical result when such pre-set count is reached.

It is a further object of the present invention to provide a decade-type electronic counter in which any number of successive decades may be cascaded so as to supply a counter having almost limitless range if such be desired.

It is another object of the present invention to provide an integrating counter in which a predetermined count may be set directly without reference to reciprocals, complementary numbers, phantom numbers, compensating factors, or other arbitrary mathematical expedients and which is, therefore, extremely simple and accurate in actual use.

With the above and other objects in view, my invention resides in the novel features of form, construction, arrangement, and combination of parts presently described and pointed out in the claims.

In the accompanying drawings—

Broadly speaking, the present invention employs some sensory apparatus which is electrically responsive to the physical phenomenon or mechanical factor desired to be measured, such as, for example, a photocell, which is capable of emitting an electrical current directly proportional to the intensity of light falling upon it. The output of the sensory device, such as the photocell, for example, is fed into a pulse generator which will emit a single pulse as soon as a sufficient quantity of output from the photocell, or other device, has been fed into it. It should be understood that the pulses emitted by the pulse generator are not uniformly periodic in terms of time, but are rather a measure of the integral of intensity in terms of time. These pulses are fed into a series of decades, each of which may be characterized as a "ring-of-five and scale-of-two" electronic circuit with the addition of ten signal lights and ten switches which operate in conjunction with a coincidence circuit and an interdecade circuit. The ten switches correspond to the successive digits in the series from "zero" to "nine" and are selective in the sense that any one of the ten switches may be set to "on" position, but only one of such switches in any decade can be so set.

The coincidence circuit in each decade contains a triode tube which is adapted to conduct current as long as a positive potential in excess of its cut-off or threshold potential is applied to its grid. The outputs from the coincidence circuits of all the decades are paralleled into the coil of a relay which, as long as it is energized, holds closed a switch controlling main line current to be disconnected at the end of the "count," so to speak. When a selected switch is set to "on" position in a given decade the coincidence circuit of that decade will be unaffected by all pulses coming into the decade except the one pulse which corresponds to the selected number. For example, if the number "seven" is set into a given decade by setting the switch corresponding to the digit seven, the triode tube in the coincidence circuit of that decade will cut off on the seventh pulse and remain off until the eighth pulse, whereupon it will conduct again.

The "interdecade" circuit in each decade also contains a triode tube which will transmit an interdecade pulse responsive to every tenth input pulse received by that decade. Thus, every time ten pulses have been fed into the units decade the interdecade circuit thereof will function to transmit a single pulse into the tens decade, and similarly, every time ten pulses have been fed from the units decade into the tens decade the interdecade circuit of the tens decade will function to transmit a single pulse into the hundreds decade. This arrangement, of course, may be cascaded through any number of successive decades which may be necessary to provide a counter having desired upper limits or capacity. The several decades are so arranged that every incoming pulse will be accurately counted and will accumulate toward the ultimate end result.

As previously pointed out, each decade can be set by manipulation of the switches associated therewith to respond to a given number. For instance, if the number "two hundred thirty four" should be the number at which the counter should initiate the desired mechanical result, the number "four" switch would be set in the units decade, the number "three" switch would be set in the tens decade and the number "two" switch would be set in the hundreds decade.

Thereupon the output from the pulse forming is fed into the units decade which performs the functions, namely, the interdecade circuit transmits an interdecade pulse into the tens decade on every tenth pulse received from the pulse former and the output from the coincidence circuit of the units decade is cut off on the fourth pulse received from the pulse generator and remains off until the next succeeding pulse is received. Similarly, on the tenth interdecade pulse received from the first decade, the interdecade circuit of the tens decade transmits an interdecade pulse into the hundreds decade and meanwhile, on every third interdecade pulse coming into the tens decade the output from the coincidence circuit of the tens decade cuts off and remains off until the next interdecade pulse is received. Since the tens decade counts by tens the third interdecade pulse received by it corresponds to the thirtieth pulse received by the units decade. Finally, the output from the coincidence circuit of the hundreds decade would be interrupted on the second interdecade pulse coming into the hundreds decade from the tens decade. This means that on every fourth pulse received from the pulse generator the coincidence circuit of the units decade will cut off. On the thirtieth pulse coming into the units decade, or in other words the third interdecade pulse passing from the units decade to the tens decade, the output from the coincidence circuit of the latter will cut off and remain off until the fortieth pulse. Hence, on the thirty-fourth pulse the coincidence circuits of the units decade and the tens decade will be cut off, so that only the coincidence circuit of the hundreds decade is conducting an output current and the relay continues to be held open. On the two hundredth pulse coming into the units decade or, in other words, the second decade, the coincidence circuit of this decade cuts off and remains off. Thereafter, on the two hundred thirtieth pulse the coincidence circuit of the tens decade cuts off and finally on the two hundred thirty fourth pulse the coincidence circuit of the units decade cuts off. Hence, on the two hundred thirty fourth pulse all coincidence circuits are simultaneously cut off and the relay drops out, thereby producing the desired mechanical result and at the same time cutting off the input from the pulse former to the units decade.

Figure 1:
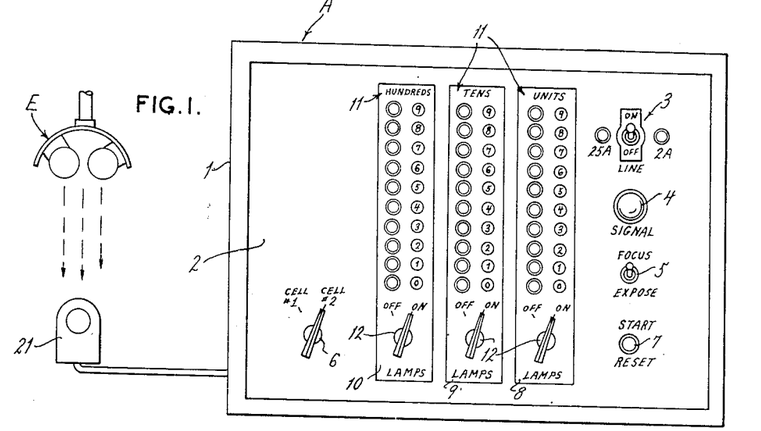
Figure 1 is a front elevational view of an electronic counter constructed in accordance with and embodying the present invention and showing such electronic counter schematically connected for determining light intensity.

Referring now in more detail and by reference character to the drawings, which illustrate a preferred embodiment of the present invention, A designates a direct-setting integrating electronic counter comprising a rectilinear cabinet 1 having a front panel 2 provided with a main switch 3 having a bulls-eye signal light 4. Also mounted on the front panel 2 is a single pole single throw focusing switch 5, a double pole double throw cell switch 6, and a double pole single throw reset-start switch 7, one pole of the latter being normally open and the other being normally closed as shown diagrammatically in Figure 4.

Also set into the front panel 2 and extending inwardly therefrom into the interior of the cabinet 1 are three spaced parallel decades 8, 9, and 10, each of identical construction and being the "units" decade, the "tens" decade, and the "hundreds" decade, respectively. Each of the decades 8, 9, and 10 is provided with a visible front panel 11 provided with ten vertically spaced neon lamps $L_0$, $L_1$, $L_2$, $L_3$, $L_4$, $L_5$, $L_6$, $L_7$, $L_8$, and $L_9$. Also mounted in and projecting through each decade panel 11 are ten push button switches $S_0$, $S_1$, $S_2$, $S_3$, $S_4$, $S_5$, $S_6$, $S_7$, $S_8$, and $S_9$, respectively, located in juxtaposition to the corresponding lights $L_0$, $L_1$, $L_2$, $L_3$, $L_4$, $L_5$, $L_6$, $L_7$, $L_8$, and $L_9$. The switches from $S_0$ to $S_9$, inclusive, are double pole single throw switches and are mechanically interlocked in any suitable and conventional manner so that when one switch is pushed in and thereby set into "on" position, any other switch which is in "on" position will be released automatically. Thus, only one such switch will be "on" at any time. The mechanical arrangement accomplishing this particular result is well-known and does not form a part of the present invention.

Each of the decade panels 11 is also provided with a single pole single throw counter-light switch 12, which merely functions to permit the operator to turn the counter-lights $L_0$ to $L_9$, inclusive, "off" or "on," at will without otherwise interrupting the normal functioning of the counter A. This is a particularly desirable function where the counter is used in photographic dark room for photographic printing control. In such applications or uses the flickering of the counter-lights $L_0$ to $L_9$, inclusive, would, of course, fog exposed sensitive materials. For other purposes, as presently will be discussed, it is desirable to employ the counter-lights in order to be able to read various counts and other results visually. In this connection it also should be pointed out that each of the decades 8, 9, and 10 are preferably, though not necessarily, constructed as an integral assembly upon a unitary chassis and can be slid in and out of position on the main panel 2 for convenience in manufacturing assembly and repair. This particular arrangement, however, is not significant and the present invention is in no manner limited thereto.

Suitably mounted within the cabinet 1 upon separate and individually removable chassis are a pulse generator 13, a power supply unit 14, a control relay 15, and a power relay 16. Also mounted at any convenient location, either within the cabinet 1 or on the back wall thereof, are two conventional double prong plug-in outlet receptacles 17, 18.

Power supply unit

Figure 4:
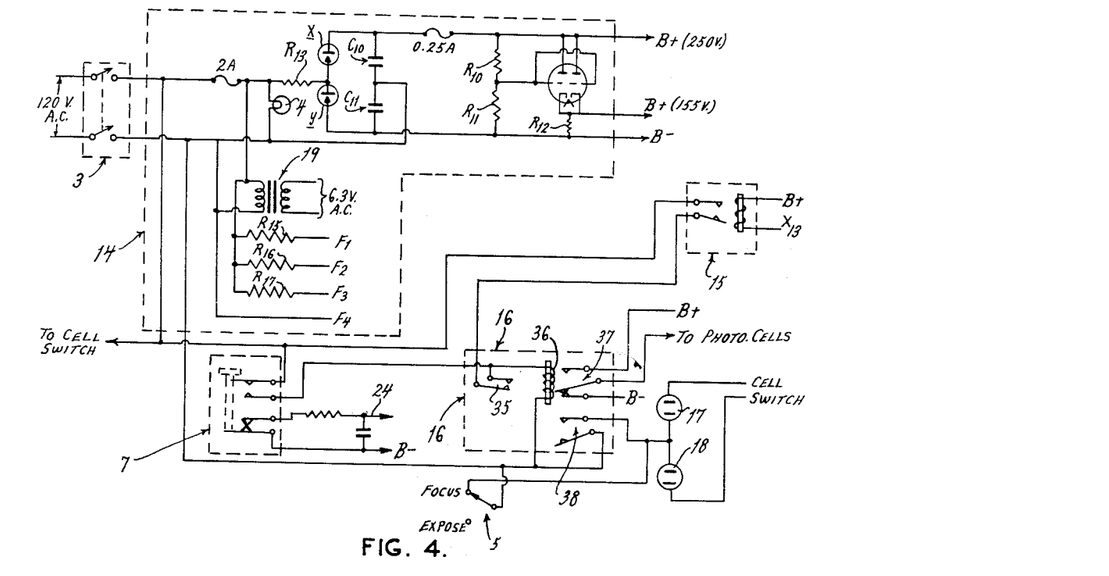
Figure 4 is a wiring diagram of the relay circuit forming a part of the present invention.
Figure 5:
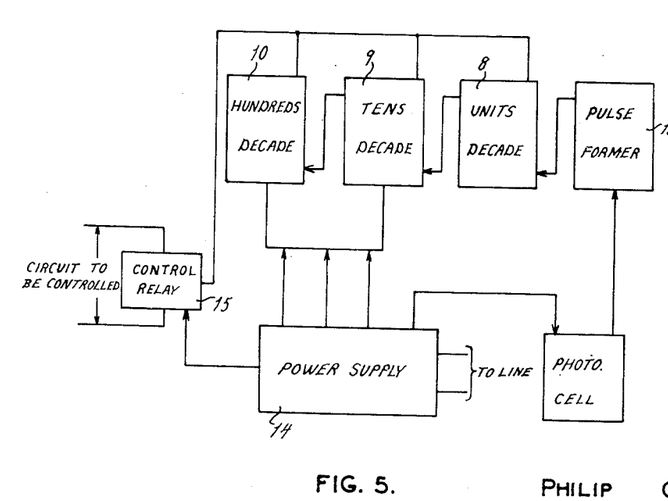
Figure 5 is a schematic view of an electronic counter constructed in accordance with the present invention and showing the relative relationship between the several components thereof.

The power supply unit 14, as shown in Figure 4, comprises a conventional full-wave voltage doubling circuit made up of rectifiers $x$ and $y$ and capacitors $C_{10}$ and $C_{11}$, together with surge-limiting resistor $R_{13}$, so as to produce approximately 250 v. D. C. from the 120 v. A. C. line. Across this D. C. power supply, a double triode vacuum tube, with both sections in parallel, is so connected to resistors $R_{10}$, $R_{11}$, and $R_{12}$, as to comprise a cathode-follower voltage regulator, so as to maintain a substantially constant potential of 155 v. across resistor $R_{12}$ although the current through $R_{12}$ varies due to its connection to other circuit elements. Also forming a part of the power unit 14 is a transformer 19, the primary of which is connected across the 120 v. A. C. leads from the main switch and being designed to produce an output potential of 6.3 v. A. C. across its secondary. The 120 v. A. C. line is also provided with three hot filament leads $F_1$, $F_2$, $F_3$, and a common return filament lead $F_4$. Interposed in the hot filament leads $F_1$, $F_2$, and $F_3$, are resistors $R_{15}$, $R_{16}$, and $R_{17}$, for reducing the voltage in the filament lines to the appropriate value. The hot filament leads $F_1$, $F_2$, and $F_3$, are respectively connected to the hot filament supply lines of the decades 8, 9, and 10, respectively, and the return filament lead $F_4$ is connected in common to the return filament leads of all the decades 8, 9, and 10. The filament connections within the decades are the conventional series string and, hence, not specifically shown.

Pulse generator

Figure 2:
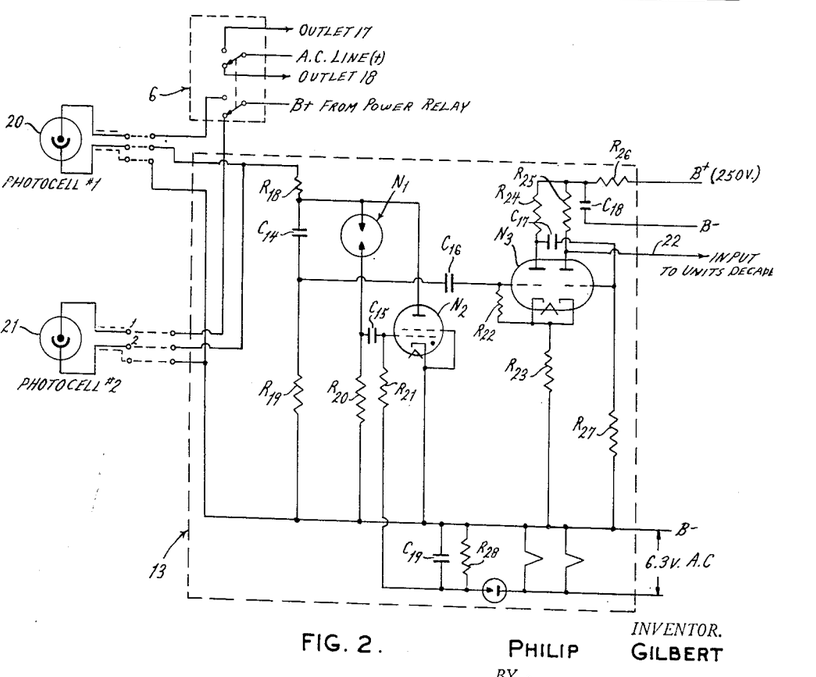
Figure 2 is a wiring diagram showing the sensing circuit or so-called "pulse-generator" in conjunction with the light measuring photocells employed in connection with the present invention when used as an exposure-determining device.

The pulse generator 13, as shown in Figure 2, comprises a neon gas discharge tube $N_1$, a gas filled thyratron tube $N_2$, and a double triode tube $N_3$ connected in a network of resistors $R_{18}$, $R_{19}$, $R_{20}$, $R_{21}$, $R_{22}$, $R_{23}$, $R_{24}$, $R_{25}$, $R_{26}$, $R_{27}$, $R_{28}$, and condensers $C_{14}$, $C_{15}$, $C_{16}$, $C_{17}$, $C_{18}$, and $C_{19}$.

Associated with the pulse generator 13 are two photocells 20, 21, either of which may be selected through the cell switch 6 which places the selected cell in operation by permitting it to be connected to B+ upon the operation of relay 16. At the same time, switch 6 selects the one of the two output receptacles to operate the particular device associated with the chosen photocell. This is a convenient arrangement where the counter A is being used as an illumination controlling device in connection with photographic work on a commercial scale for in such applications one of the photocells may be located within the dark room, where certain types of photographic operations are being performed, and the other photocell may be located in the exposure room where other types of photographic operations are being performed, and the operator can switch, at will, from one cell to the other as the needs of the moment may require.

The photocells 20, 21, as is well understood, will act, depending upon which one has been selected for operation, as a valve or control means to regulate the current flowing from the B+ lead into the capacitor $C_{14}$. This output is, of course, a fluctuating current which varies responsive to variation in the amount of illumination falling upon the operative photocell. This output current from the photocell charges up the capacitor $C_{14}$ until the striking potential of the tube $N_1$ is reached. The discharge of the tube $N_1$ through resistor $R_{20}$ transmits a positive pulse to the grid of the normally biased-off thyratron $N_2$ which then fires, completing the discharge of capacitor $C_{14}$ and thereby emitting a short negative pulse which is amplified through the tube $N_3$ and is fed into the input lead 22 running into the units decade 8.

The thyratron tube $N_2$ uniquely co-operates with the neon tube $N_1$ to produce an output pulse signal having shorter rise time, greater amplitude, and lower impedance than the type of signal obtained merely from the relaxation of the gas diode or neon tube $N_1$. Heretofore some efforts have been made to employ a gas diode alone to generate pulses through the discharge of a capacitance circuit, but the base potential to which gas diode tubes ordinarily discharge is relatively inexact and varies appreciably from discharge to discharge, so that the functioning of such a circuit is not reliable because the base point to which the tube discharges is not uniformly reproducible. It has been found, however, in connection with the present invention, that the combination of a thyratron tube with a gas diode produces an accurately reproducible low base point of discharge rather than the high and erratic base of the gas diode. Hence, it is possible, with the circuit of the type shown in Figure 2, to provide accurate pulses which precisely integrate the intensity of input current in terms of time. In other words, if the amount of light falling on the photocell 21 (assuming that the photocell 21 is the photocell selected for operation) is of comparatively high intensity for a given period of time the output from the photocell 21, which is fed into the capacitance network of the pulse generator 13, will be relatively high so that the capacitance network will charge up more rapidly and, hence, discharge with greater frequency producing a larger number of pulses within such given period of time. On the other hand, if the intensity of light falling upon the photocell 21 is relatively low for any given period of time the output from the photocell 21 will be comparably low and the capacitance network of the pulse of the generator 13 will charge up at a slower rate, thereby producing a lesser number of pulses within such given period of time. It will thus be seen that each pulse is a measure of a unit of quantity and by counting the number of pulses generated it is possible to determine the quantity of light falling upon the photocell.

*Decade counter units*

Each of the decade counter units 8, 9, and 10 are identical and, therefore, only the units decade will be described in detail herein.

Figure 3A:
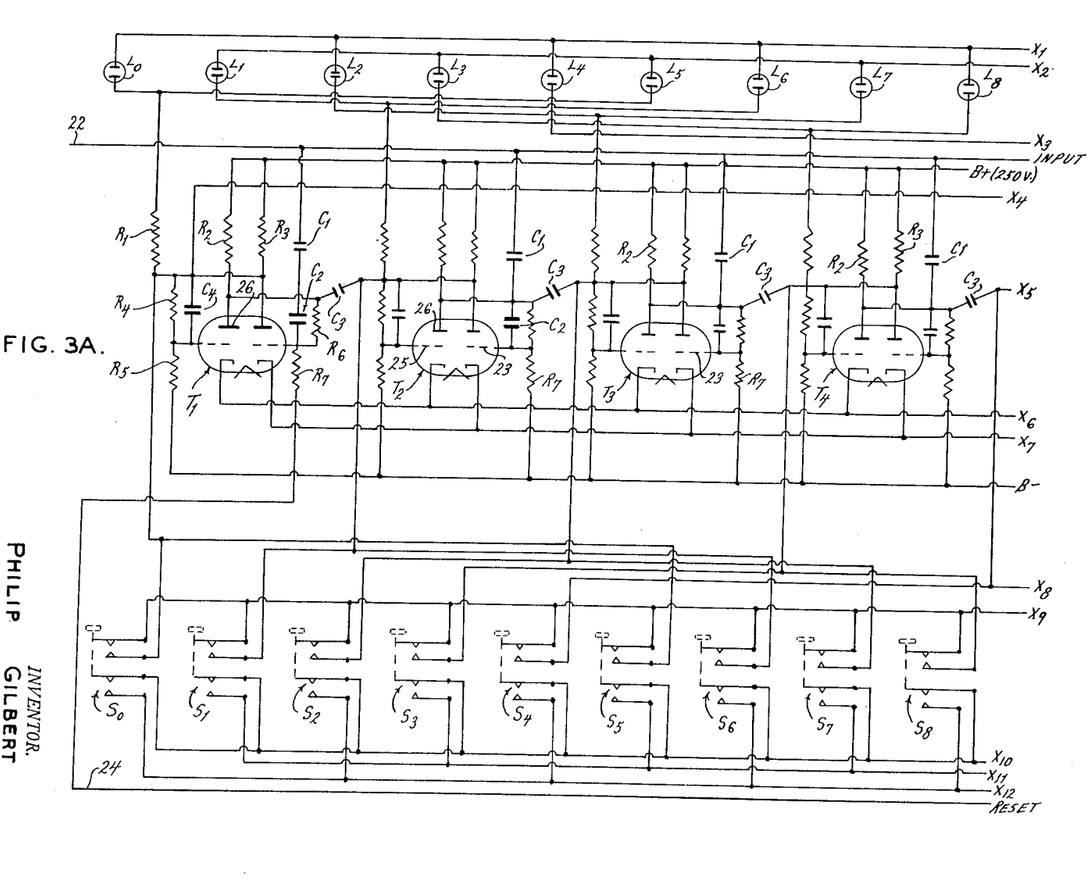
Figures 3A and 3B, taken together, is a wiring diagram of a single decade forming a part of the present invention.
Figure 3B:
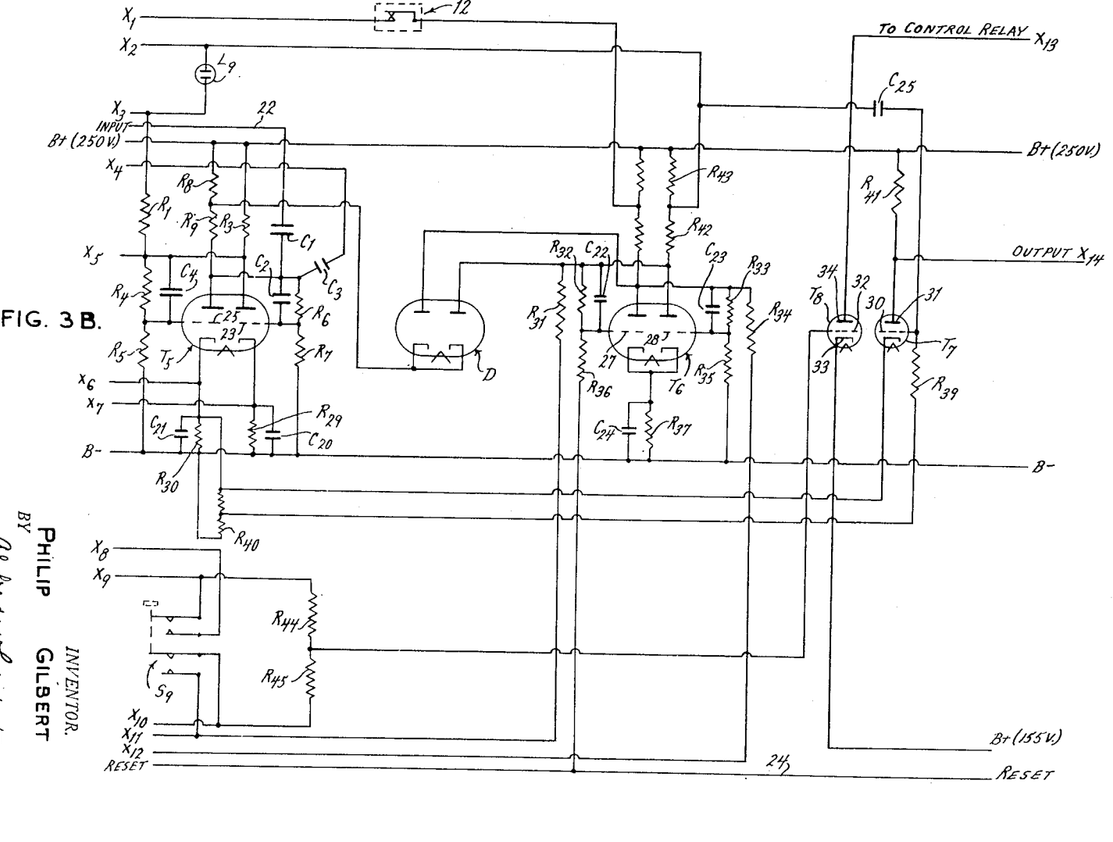

The units decade 8, as previously noted, includes ten counter-lights $L_0$, $L_1$, $L_2$, $L_3$, $L_4$, $L_5$, $L_6$, $L_7$, $L_8$, and $L_9$, and ten number-switches $S_0$, $S_1$, $S_2$, $S_3$, $S_4$, $S_5$, $S_6$, $S_7$, $S_8$, and $S_9$, connected as shown in the wiring diagram Figures 3A—3B. The units decade also includes five double triode tubes $T_1$, $T_2$, $T_3$, $T_4$, and $T_5$, each of which is connected in a network consisting of resistors $R_1$, $R_2$, $R_3$, $R_4$, $R_5$, $R_6$, $R_7$, and condensers $C_1$, $C_2$, $C_3$, $C_4$, to form a trigger circuit, and the five trigger circuits are successively connected to each other and the fifth trigger circuit is regeneratively connected back to the first trigger circuit to form a "ring-of-five" arrangement.

It will be noted by reference to Figures 3A—3B that the cathodes of all the tubes $T_1$, $T_2$, $T_3$, $T_4$, and $T_5$, are linked together in common cathode coupling circuits by means of the leads $X_6$, $X_7$, the resistors $R_{29}$, $R_{30}$, and condensers $C_{20}$, $C_{21}$. The right hand grids 23 of each of the tubes $T_1$, $T_2$, $T_3$, $T_4$, and $T_5$, are connected through condensers $C_1$, $C_2$, to the input lead 22. The first tube $T_1$ is also connected through the resistor $R_7$ to the lead 24 coming from the reset-start switch 6 and thence to the B— lead, whereas the grids 23 of all the other tubes $T_2$, $T_3$, $T_4$, and $T_5$ are connected directly to the B— lead. Similarly, the left hand grids 25 of all five tubes $T_1$, $T_2$, $T_3$, $T_4$, and $T_5$ are connected in common directly to the B— lead. Thus, when the reset switch is depressed the grid 23 of the first tube $T_1$ is disconnected momentarily so that the right-hand side, so to speak, of this tube $T_1$ begins to conduct.

By reason of the common cathode coupling circuits, above-mentioned, only one of the five tubes $T_1$, $T_2$, $T_3$, $T_4$, and $T_5$, can be in such configuration that its right-hand side, so to speak, will be conducting at any given time. Hence, the other tubes $T_2$, $T_3$, $T_4$, and $T_5$ will immediately be set up in such configuration that their left-hand sides, so to speak, will be conducting.

When the first pulse emitted by the pulse generator 13 travels along the the input lead 22 it will be simultaneously imposed upon the grids 23 of all five tubes $T_1$, $T_2$, $T_3$, $T_4$, and $T_5$, but since only the first tube $T_1$ is in such configuration that its right-hand side is conducting only that tube, namely, the tube $T_1$, will be affected by this negative pulse and the tube $T_1$ will be caused thereby to switch over so that its left-hand side begins to conduct and correspondingly the right-hand side ceases to conduct. As the tube $T_1$ flips over, so to speak, a transfer pulse is transmitted from the plate 26 and applied to the grid 25 of the next succeeding tube $T_2$. Thereupon, such next succeeding tube $T_2$ flips over so that its left-hand side which was conducting now ceases to conduct and correspondingly its right-hand side which was not conducting begins to conduct. In other words, the right-hand side of the tube $T_2$ becomes conditioned to receive the next succeeding pulse travelling along the input lead 22 and simultaneously the right-hand side of the tube $T_1$, having now ceased to conduct, is no longer in condition to be affected by negative pulse. Similarly, nothing has happened to the configuration of the remaining tubes $T_3$, $T_4$, and $T_5$, so that they also are not affected by negative pulses on the input lead 22. The second pulse on the input lead 22 will, therefore, affect the second tube $T_2$ and cause it to flip over again to its initial configuration in the same manner as previously described in connection with the response of the tube $T_1$ to the first impulse and this change of configuration of the tube $T_2$ will in turn produce a transfer pulse which is passed on to the next succeeding or third tube $T_3$. Each successive tube will thus become, in turn, affected by succeeding negative pulses on the input lead 22. The fifth pulse, which induces a change in configuration of the fifth tube $T_5$, will be regeneratively transmitted along the lead $X_4$ back to the first tube $T_1$ conditioning the latter to receive the sixth pulse, so that the five tubes, in effect, count by "fives" in continuously successive order as long as negative pulses continue to come in off of the input lead 22.

The transfer pulse, emitted by the fifth tube $T_5$, is also applied to the grids 27, 29 of a double triode tube $T_6$ which is connected, as shown in Figure 3B, in a conventional trigger-circuit network consisting of resistors $R_{31}$, $R_{32}$, $R_{33}$, $R_{34}$, $R_{35}$, $R_{36}$, and condensers $C_{22}$, $C_{23}$, substantially similar to the previously described trigger networks associated with the tubes $T_1$, $T_2$, $T_3$, $T_4$, and $T_5$. The cathodes of the tube $T_6$ are connected in common through a resistor $R_{37}$ and a condenser $C_{24}$ to the B— lead.

Because the "ring-of-five" circuit will emit positive as well as negative pulses and the negative pulses are the only ones which are significant for counting purposes it has been found necessary in connection with the present invention, to interpose a double diode tube D which functions as a clamping tube or rectifier to transmit only the negative pulses. Hence, the trigger tube $T_6$ will receive only the negative transfer pulses emitted by the tube $T_5$. In other words, the trigger tube $T_6$ will receive a transfer pulse responsive to every fifth negative pulse coming in from the input line 22. It will also be noted by reference to Figure 3B that the left-hand grid 27 of the tube $T_6$ is connected through the resistor $R_{36}$ to the reset line 24. Hence, when the reset switch is pressed to condition the tube $T_1$, as previously described, and the trigger tube $T_6$ will be simultaneously conditioned or set up in a configuration such that its left-hand side is conducting and its right-hand side is "off." Hence, the first transfer pulse impressed upon the trigger tube $T_6$ will cause it to change its configuration so that its left-hand side goes "off" and its right-hand side begins to conduct. Similarly, on the next transfer pulse received by the tube $T_6$, that is to say the transfer pulse corresponding to the fifth negative pulse coming in from the input lead 22, the trigger tube $T_6$ will again change its configuration so that its right-hand side ceases to conduct and its left-hand side begins to conduct, that is to say, returns to its original configuration.

Also included within the units decade 8 is a single triode tube $T_7$ which functions as an interdecade discriminatory tube of so-called "polarity descriminator" having a cathode 27 which is connected through a resistor $R_{30}$ to the B— lead. The grid 30 of the tube $T_7$ is connected to the resistor $R_{39}$ and the resistor $R_{40}$ to the B— lead and is, therefore, normally impressed with a strong negative bias which is below its normal cut-off potential. Hence, the interdecade discriminatory tube $T_7$ will ordinarily be in a non-conducting or "off" condition. The grid 30 of the interdecade discriminatory tube $T_7$ is connected by a capacitor $C_{25}$ to a voltage-dividing network consisting of a resistor $R_{42}$ and a resistor $R_{43}$, the voltage dividing network being connected across the plate on the right-hand side of the trigger tube $T_6$ and the 250 v. B+ lead. The interdecade discriminatory tube $T_7$ together with the resistors $R_{42}$, $R_{43}$, and capacitor $C_{25}$ may be referred to, for convenience, as the interdecade transfer circuit. As has been above pointed out, the plate of the right-hand side of the trigger tube $T_6$, in effect, emits a negative pulse responsive to every fifth input pulse coming into the "ring-of-five" circuit from the input lead 22 and a positive pulse in response to every tenth pulse coming into the "ring-of-five" circuit from the input lead 22. The negative pulses emitted by the plate 31 of the trigger $T_6$ do not have any effect on the condition of the interdecade discriminatory tube $T_7$ since its grid is already strongly negative. However, the positive pulses, which are momentarily impressed upon the grid 30 of the interdecade discriminatory tube $T_7$ responsive to every tenth pulse coming into the "ring-of-five" circuit from the input lead 22 cause the interdecade discriminatory tube $T_7$ to conduct and hence the voltage on the plate 31 thereof drops sharply producing, in effect, a sharp negative pulse in the output lead $X_{14}$, which is connected to the input lead 22 of the next succeeding decade 10.

*Selector switch circuits*

As has been above pointed out, each decade includes ten selector switches $S_0$, $S_1$, $S_2$, $S_3$, $S_4$, $S_5$, $S_6$, $S_7$, $S_8$, and $S_9$, or number switches as they may be called, and the visible operating buttons thereof each labeled with a digit ranging from zero up to nine, respectively. The several selector switches $S_0$, $S_1$, $S_2$, $S_3$, $S_4$, $S_5$, $S_6$, $S_7$, $S_8$, and $S_9$, are connected, as shown in Figures 3A—3B, through an isolating network consisting of resistors $R_{44}$ and $R_{45}$ to the grid 32 of a coincidence tube $T_8$, which is a vacuum tube of the single triode type substantially similar to the single triode tube $T_7$.

In connection with the tubes $T_7$ and $T_8$ it should be noted that for convenience in manufacture it is possible to eliminate the use of two single triode tubes and substitute therefor one double triode tube of the same type as the double triode tube used elsewhere in the device. In this case, of course, the two halves of the double triode tube will be entirely independent of each other and will respectively function exactly in the manner of the two separate tubes $T_7$ and $T_8$. The use of such a double triode tube may, for manufacturing purposes, be considered convenient and economical since it is thereby possible to use the same kind of tubes throughout the device rather than to employ various different kinds of tubes at different points in the circuit. This latter expedient is, of course, common practice and has no particular bearing upon the present invention.

The cathode 33 of the coincidence tube $T_8$ is connected directly to the 155 v. B+ lead and the plate 34 is connected through lead $X_{13}$ to the control relay 15, as will presently be more fully described.

The coincidence tube $T_8$, having its cathode held at a potential of 155 v., will conduct current as long as a positive potential in excess of 155 v., minus cut-off bias, is supplied to the grid 32.

Figure 6:
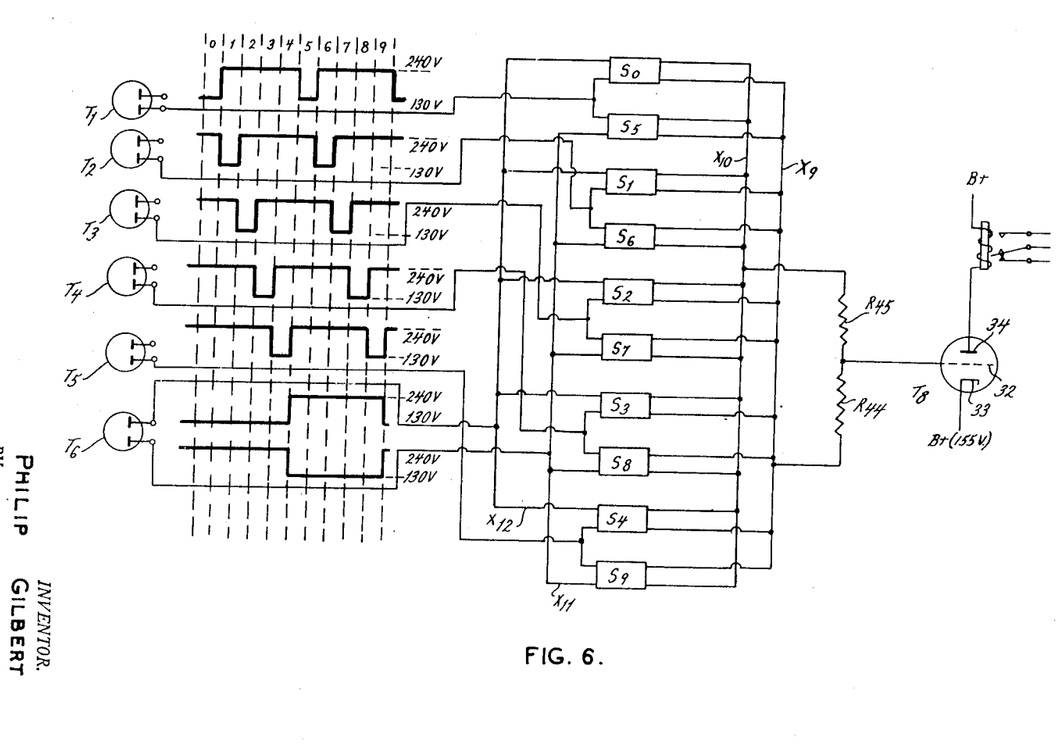
Figure 6 is a schematic diagram illustrating the relationship between the various components of a decade in terms of the sequence of electronic results occurring during a single cycle of operation.

The operation of the selector switch circuit can thus be understood by reference to the schematic drawing in Figure 6 wherein the tubes $T_1$, $T_2$, $T_3$, $T_4$, $T_5$, $T_6$, $T_7$, and $T_8$ are shown. In Figure 6, for purposes of clarity, only the transfer-pulse emitting side of the tubes $T_1$, $T_2$, $T_3$, $T_4$, and $T_5$, are considered and leads from the transfer-pulse emitting plates thereof are schematically shown as being connected directly into the two selector switches associated therewith. Furthermore, the selector switches are not shown in numerical order, but are illustrated in such a manner that the two selector switches $S_0$ and $S_5$, which are associated with the tubes $T_1$, are located more or less opposite to the tube $T_1$. Similarly, the two selector switches $S_1$ and $S_6$ are shown in opposite alignment, in Figure 6, to the tube $T_2$. Finally, the series of vertical dotted lines form graph-intervals or spaces associated with the digits ranging from zero to nine and thus schematically indicate nine successive pulses coming into the "ring-of-five" circuit so that it is possible to trace the condition of all the several circuits after each particular pulse. For convenience in illustration a voltage curve is drawn above each plate lead. It will be noted that the pulse emitting plate elements of the tubes $T_1$, $T_2$, $T_3$, $T_4$, $T_5$, and $T_6$, all vary between a maximum of 240 v. and a minimum of 130 v. depending whether the particular tube is "on" or "off".

Each of the selector switches $S_0$, $S_1$, $S_2$, $S_3$, $S_4$, $S_5$, $S_6$, $S_7$, $S_8$, and $S_9$, being a single pole double throw switch, may be said to have two current paths through it. One pole of each of the switches is connected through the common lead $X_{10}$ to the external side of the resistor $R_{45}$ and the other pole is connected either to the lead $X_{11}$ or the lead $X_{12}$ to one or the other of the plates of the trigger tube $T_6$. It will be noted that the selector switches $S_0$, $S_2$, $S_4$, $S_6$, $S_8$, are connected to the lead $X_{12}$ and the selector switches $S_1$, $S_3$, $S_5$, $S_7$, and $S_9$ are connected to the lead $X_{11}$. Hence, one current pathway through all of the selector switches $S_0$, $S_1$, $S_2$, $S_3$, $S_4$, $S_5$, $S_6$, $S_7$, $S_8$, and $S_9$, carries current from either one or the other of the plates of the trigger tube $T_6$.

The other current pathway in each of the selector switches $S_0$, $S_1$, $S_2$, $S_3$, $S_4$, $S_5$, $S_6$, $S_7$, $S_8$, and $S_9$ are harnessed together in pairs, as best illustrated in Figure 6, and are thus connected respectively to the tubes $T_1$, $T_2$, $T_3$, $T_4$, $T_5$. The other side of this second curve pathway through each of the selector switches $S_0$, $S_1$, $S_2$, $S_3$, $S_4$, $S_5$, $S_6$, $S_7$, $S_8$, and $S_9$, is connected by a common lead $X_9$ to the external end of the resistor $R_{44}$.

Suppose, for example, the selector switch $S_7$ of the units decade 8 is pressed down or set into "on" position. All of the other selector switches, as has been above pointed out, are open. Therefore, the plate potential of the right-hand half of the tube $T_3$ (reference being to Figure 3A) is connected across one side of the isolating network and the plate potential of plate 31, that is to say, the right-hand plate of trigger $T_6$, is connected across the other side of the isolating network. At the first input pulse, as will be seen by following down the space between the first two dotted lines in Figure 6, that is to say, the space associated with the digit 1, the plate potential from the tube $T_3$ is at 240 v. and the plate potential from the trigger tube $T_6$ is also 240 v. Thus, a potential of 240 v. is applied to both sides of the isolation network which is substantially more positive than the cathode potential of 155 v. so the tube $T_8$ remains "on." On the second impulse the plate potential from tube $T_3$ is down to 130 v. while the plate potential from tube $T_6$ remains at 240 v. Thus, a potential of 240 v. is applied on one side of the isolating network and a potential of 130 v. is applied on the other side thereof. The average of these two potentials is 185 v. Therefore, the potential applied upon a grid of the coincidence tube $T_8$ is 185 v., which is still substantially more positive than the cathode potential of 155 v. Consequently the coincidence tube $T_8$ remains "on," or conducting. Similarly, at the third input pulse the plate potential from the tube $T_6$ remains at 240 v. Since potentials of 240 v. are now applied on both sides of the isolating network the potential applied to the grid of the coincidence tube $T_8$ is now 240 v. and again the coincidence tube $T_8$ remains "on." A similar situation exists through the fourth pulse. At the fifth pulse the plate potential from the tube $T_3$ remains at 240 v. but the plate potential from the trigger tube $T_6$ drops to 130 v. Again, potentials of 240 v. and 130 v., respectively, are applied across the isolating network resulting in an average potential of 185 v. which is applied to the grid of the coincidence tube $T_8$ and the same condition prevails upon the sixth pulse.

On the seventh pulse, however, the plate potential from the tube $T_3$ drops to 130 v. and the plate potential from the trigger tube $T_6$ remains at 130 v. Consequently, potentials of 130 v., respectively, are applied to both sides of the isolating network and a potential of 130 v. is, therefore, applied to the grid of the coincidence tube $T_8$. Since this voltage biases the grid substantially below cut-off, the coincidence tube $T_8$ will cease to conduct current from the control relay 15 through the lead $X_{13}$ until the next succeeding pulse, that is to say, the eighth pulse, comes into the circuit. It should be noted in this connection that the pulses themselves are of relatively short duration, but the condition initiated by and resulting from the pulses is stable until it is changed by the next succeeding pulse. The circuits may thus be said to be switched from one condition of stability to an alternative condition of stability by the various incoming pulses.

As has been heretofore pointed out, the several leads $X_{13}$ from the different decades 8, 9, and 10 are connected in common to the energizing coil of the control relay 15 and, as a result, the control relay 15 is held closed so long as any one of the three coincidence tubes $T_8$ are conducting current. When, however, the coincidence tubes $T_8$ of the three decades all are simultaneously cut off or in "coincidence," so to speak, no current will be transmitted to the control relay 15 on any of the leads $X_{13}$. Hence, the control relay 15 will drop open.

*Control circuits*

As will be seen by reference to Figure 4 the control relay 15 operates a pair of contacts which are in series with a conventional lock-in switch 35 forming a part of the power relay 16. The energizing coil 36 of the power relay 16 is connected at one end directly to one side of the 120 v. A. C. line and at its other end through the reset switch to the other side of the 120 A. C. line. The power relay also includes a photocell switch 37 and an outlet switch 38.

The blade of the photocell switch is connected through the cell switch 6 to the photocell 20, 21, and the two poles of the photocell switch 37 are respectively connected to the B+ and B− leads, the latter, in effect, functioning as a ground. The blade of the outlet switch 38 is connected directly to the one side of the 120 v. A. C. line pole of the outlet switch 38 and is connected in common to one contact terminal of each of the outlets 17, 18. The other contact terminals of the outlets 17, 18, are respectively connected through the cell switch optionally to the other side of the 120 v. A. C. line. For convenience the focus switch 5 is connected so as to by-pass the outlet switch 38 whenever desired.

When the reset-start switch 7 is closed the coil 36 of the power relay will be energized and the relay will be closed, that is to say, the lock-in switch 16 will be closed so that the relay stays in closed position. Similarly, the photocell switch 37 will be closed so that one or the other of the photocells 20, 21, will be connected to the B+ line depending upon the position of the cell switch 6. Finally, the outlet switch 38 will be closed so that the solenoid operated shutter or other mechanical device which is to be actuated by the counter A can be plugged into one or the other of the outlets 17, 18, and will function therefrom.

Where, as herein described, the electronic counter A is used for photographic work a conventional solenoid actuated shutter (not shown) may be plugged into the outlet 18, for example, and will thus be associated with the photocell 21 in the exposure room. Similarly, a printing light located in the dark room may be plugged into the outlet 17 and thus associated with photocell 20 which may also be located in the dark room. Hence, by proper manipulation of the cell switch 6 photographic print operations in the dark room or photographic exposure operations in the camera room may, in the alternative, be controlled by the counter A.

Operation

For purposes of describing the operation of the integrating electronic counter A it will be assumed herein that the device is employed in conjunction with photographic exposure work. It should be understood, however, that the present invention is by no means limited to photographic applications, inasmuch as the counter A can be used to control any type of electrically operated device in response to an integrated measurement where the quantity to be measured is capable of being measured in terms of electrical response. In the illustrative example herein employed the photocells 20, 21, are merely one type of sensory device capable of emitting an electrical impulse which is a measure of an external phenomenon.

If the counter A, therefore, is to be used for determining exposure-time in making photographic reproductions in a commercial photographic plant, a solenoid actuated camera shutter can be plugged into the outlet 18 and the photocell 21 placed upon the copy board facing the exposure light E so that the same amount of light which impinges upon the photographic work will also fall upon the sensory element of the photocell 21. It will, of course, be understood that the cell switch 6 is set to the position shown in Figure 2. The camera may then be focused by moving the focus switch 5 into the position shown in Figure 4, thus opening the shutter. When the camera has been properly focused in the conventional manner the focus switch 5 is shifted back to "expose" position, closing the shutter.

Meanwhile the operator, with due regard for the relative speed of the sensitive material to be exposed as well as the effective aperture of the camera diaphragm, will determine the amount of exposure, generally through the following procedure: In changing from a timer to an integrating photometer, the photographer usually finds it convenient to fit a diaphragm to the photocell to control the amount of light impinging upon it, so that, with the light sources which he uses, the counting rate is approximately one count per second. Thus, he is able to convert his established exposure times into integrator counts. Suppose, for example, that he determined the amount of exposure to be two hundred thirty-four units. He, thereupon, sets the number two hundred thirty-four into the counter A by pressing the number "two" switch, $S_2$, in the hundreds decade, the number "three" switch, $S_3$, in the tens decade, and the number "four" switch, $S_4$, in the units decade. It should be noted that the number "two hundred thirty-four," selected for purposes of the present explanation, is the same as the number similarly chosen in the generalized explanation above set forth. It should also be pointed out that the counter A may be calibrated in foot candle-seconds, lumen-seconds, or any other arbitrarily selected unit of measurement which may be suitable.

Thereupon, the reset-start switch 7 is closed energizing the solenoid 36 of the power relay and closing the lock-in contacts 16, the photocell contacts 37 and the outlet contacts 38. Immediately the tubes $T_1$ in each decade are set up to receive the initial count and the coincidence tubes $T_3$ are disposed in conducting condition so that the control relay will remain closed upon release of the reset-start switch 7. Thereupon, the light falling upon the photocell 21 will cause it to conduct current into the pulse generator 13 which will, in turn, begin to transmit negative pulses into the units decade 8 along the input lead 22.

The input pulses will not necessarily be uniform in terms of time, but will correspond to units of light-quantity and these units will be counted by the "ring-of-five" and "scale-of-two" circuits in the units decade 8. Every tenth pulse coming into the units decade will, as heretofore described, initiate an interdecade transfer pulse which will be transmitted into the input lead 22 of the tens decade, nine, and every hundredth impulse coming into the units decade will, similarly, initiate an interdecade pulse which will be transmitted from the tens decade, nine, into the input lead 22 of the hundreds decade.

Meanwhile on every fourth pulse coming into the units decade 8 the switch $S_4$ will function, as heretofore generally described, in conjunction with the coincidence tube $T_3$ to temporarily cut off the flow of current through the coincidence tube $T_3$ to the control relay 15. This current cut-off through the coincidence tube $T_3$ of the units decade will occur on the fourth, fourteenth, twenty-fourth, thirty-fourth, and forty-fourth pulses and so on up to and through the two hundred thirty-fourth pulse coming into the units decade 8. Similarly, the switch $S_3$ of the tens decade will function in conjunction with the coincidence tube $T_3$ of such decade to interrupt the flow of its current into the control relay 15 on every thirtieth pulse coming into the units decade 8, that is to say, on every third interdecade pulse transmitted from the units decade 8 to the tens decade 9. As previously pointed out this cut-off condition of the coincidence tube $T_3$ in the tens decade will continue until the fourth interdecade pulse is received by the tens decade from the units decade, or in other words, until the fortieth pulse is transmitted into the units decade from the pulse generator 13. Finally, the selector switch $S_2$ of the hundreds decade 10 will operate in conjunction with the coincidence tube $T_3$ of such decade to interrupt the flow of current through the coincidence tube $T_3$ to the control relay 15 on every second interdecade transfer pulse received by the hundreds decade from the tens decade or, in other words, on every two hundredth pulse coming into the units decade from the pulse generator 13. This cut-off condition in the coincidence tube $T_3$ of the hundreds decade will continue until the next interdecade pulse is received, but in the present instance since the device is set for the number "two hundred thirty-four" the entire operation will cease before such next interdecade pulse is received. Actually, the coincidence tube $T_3$ of the hundreds decade drops into "off" condition at the two hundredth pulse and remains "off." The device continues counting, however, and on the two hundred thirtieth pulse the coincidence tube $T_3$ of the tens decade drops into "off" condition. Finally, when the count of "two hundred thirty-four" is reached the coincidence tube $T_3$ of the units decade drops into "off" condition and at this instant all current flowing into the control relay 15 is interrupted simultaneously so the control relay 15 drops open.

As the control relay 15 opens the flow of current to the lock-in switch of the relay 16 is interrupted and the relay 16 opens, immediately cutting off flow of current to the photocell 21 and through the outlet 18 to the solenoid actuated shutter of the camera. Thus, the camera shutter immediately closes and the flow of pulses from the pulse generator 13 into the units decade 8 ceases. The exposure is consequently terminated automatically when a volume of light equivalent to two hundred thirty-four units has impinged upon the work being photographed. If for any reason it should be necessary or desirable to do so the exposure which was employed can be read, for ready reference, from the face of the counter A inasmuch as the counter-light $L_2$ is lighted in the hundreds decade, the counter-light $L_3$ is lighted in the tens decade, and the counter-light $L_4$ is lighted in the units decade.

It will, of course, be evident that the counter A is extremely simple and convenient to use since the desired end result may be set directly into the machine by depressing the appropriate selector switches in each decade. Furthermore, the counter A is substantially fool proof since it will readily reveal through observation of the lighted counter lights where any repair may be needed in case of mis-functioning. For example, if one of the tubes should happen to burn out anywhere in the counter A the device would stop functioning at some intermediate point short of the desired result and the configuration of the counter-lights would serve as an immediate indication of the nature and location of the difficulty.

It should be understood that changes and modifications in the form, construction, arrangement, and combination of the several parts of the electronic counting device may be made and substituted for those herein shown and described without departing from the nature and principle of my invention.

Having thus described my invention, what I claim and desire to secure by Letters Patent is:

1. An electronic device including a plurality of decades each comprising a ring-of-five circuit, a scale-of-two circuit in each decade, a coincidence circuit in each decade having an output lead and a control element so arranged that the coincidence circuit will transmit electrical current to its output lead as long as the potential of the control element is in excess of a predetermined cut-off potential, an isolating network in each decade having opposite input leads and an output lead connected to the control element of the coincidence circuit, ten switches in each decade, each switch having two separate current paths therethrough respectively connected to the input leads of the isolating network, one of said paths in each switch being also connected to the scale-of-two circuit and the other path being connected to the ring-of-five circuit, said switches being interconnected so that only one of them can be "on" at one time whereby to cause the isolating network to impose upon the control element of the coincidence circuit a potential substantially below the cut-off potential thereof responsive to a predetermined count, and a relay having an operating coil adapted upon being energized to hold the relay in a selected position, said operating coil being energized in common through all the output leads from the coincidence circuits of the decades so that when all said coincidence circuits are biased off coincidentally the relay will move out of said selected position.

2. An electronic counter including a plurality of decades each decade including a ring-of-five circuit comprising five cascaded trigger circuits, a scale-of-two circuit, a coincidence circuit associated with each decade and having an output lead and a control element so arranged that the coincidence circuit will transmit electrical current to its output lead as long as the potential of the control element is in excess of a predetermined cut-off potential, an isolating network associated with each decade and having opposite input leads and an output lead connected to the control element of the coincidence circuit, ten switches each of said switches having two separate pairs of contact-elements, the contact-elements of each pair being optionally connected by a contact-blade, the contact-blades of each switch being mechanically connected for simultaneously opening and closing, thereby establishing two distinct current paths through each switch, one contact-element of each pair within each such switch being respectively connected to the input leads of the isolating network, the other contact-element of one pair within each switch being connected to the scale-of-two circuit and the other contact-element of the other pair being connected to a selected trigger circuit in the ring-of-five circuit and being so arranged that each trigger circuit is connected to two different switches, said switches being interconnected so that only one of them can be "on" at one time whereby to cause the isolating network to impose upon the control element of the coincidence circuit a potential substantially below the cut-off potential thereof responsive to a predetermined count, and a single relay common to all the decades, said relay having an operating coil adapted upon being energized to hold the relay in a selected position, said operating coil being energized in common through all the output leads from the coincidence circuits of the several decades so that when all said coincidence circuits are biased off coincidentally the relay will move out of said selected position.

3. An electronic counter including a plurality of decades each decade including a ring-of-five circuit comprising five cascaded trigger circuits, a scale-of-two circuit, a coincidence circuit associated with each decade and having an output lead and a control element so arranged that the coincidence circuit will transmit electrical current to its output lead as long as the potential of the control element is in excess of a predetermined cut-off potential, an isolating network associated with each decade and having opposite input leads and an output lead connected to the control element of the coincidence circuit, ten switches each of said switches having two separate pairs of contact-elements, the contact-elements of each pair being optionally connected by a contact-blade, the contact blades of each switch being mechanically connected for simultaneously opening and closing, thereby establishing two distinct current paths through each switch, one contact-element of each pair within each such switch being respectively connected to the input leads of the isolating network, the other contact-element of one pair within each switch being connected to the scale-of-two circuit and the other contact-element of the other pair being connected to a selected trigger circuit in the ring-of-five circuit and being so arranged that each trigger circuit is connected to two different switches and only two, said switches being mechanically interconnected so that only one of them can be "on" at one time whereby to cause the isolating network to impose upon the control element of the coincidence circuit a potential substantially below the cut-off potential thereof responsive to a predetermined count, and a single relay common to all the decades, said relay having an operating coil adapted upon being energized to hold the relay in a selected position, said operating coil being energized in common through all the output leads from the coincidence circuits of the several decades so that when all said coincidence circuits are biased off coincidentally the relay will move out of said selected position.

4. An electronic device including a ring-of-five circuit having five cascaded trigger circuits arranged as first, second, third, fourth, and fifth trigger circuits, respectively, means for imposing an impulse upon the first trigger circuit, a scale-of-two circuit operatively connected to the fifth trigger circuit, a coincidence circuit having an output lead and a control element so arranged that the coincidence circuit will transmit electrical current to its output lead as long as the potential of the control element is in excess of a predetermined cut-off potential, an isolating network having opposite input leads and an output lead, said output lead being connected to the control element of the coincidence circuit, and ten switches each of said switches having two separate current paths therethrough respectively connected to the input leads of the isolating network, one of said paths in each switch being also connected to the scale-of-two circuit and the other path being connected to one of the trigger circuits in the ring-of-five circuit, said switches being interconnected so that only one of them can be "on" at one time whereby to cause the isolating network to impose upon the control element of the coincidence circuit a potential substantially below the cut-off potential thereof responsive to a predetermined count.

5. In an electronic device including a plurality of decades arranged in successive order each decade comprising a ring-of-five circuit, a scale-of-two circuit associated with each ring-of-five circuit, a coincidence circuit associated with each decade having an output lead and a control element so arranged that the coincidence circuit will transmit electrical current to its output lead as long as the potential of the control element is in excess of a predetermined cut-off potential, a discriminating circuit having an input lead from the scale-of-two circuit and an output lead to the ring-of-five circuit of the next successive decade, an isolating network associated with each decade having opposite input leads and an output lead connected to the control element of the coincidence circuit, ten switches each of said switches having two separate current paths therethrough respectively connected to the input leads of the isolating network, one of said paths in each switch being also connected to the scale-of-two circuit and the other path being connected to the ring-of-five circuit, said switches being interconnected so that only one of them can be "on" at one time whereby to cause the isolating network to impose upon the control element of the coincidence circuit a potential substantially below the cut-off potential thereof responsive to a predetermined count, and a relay having an operating coil adapted upon being energized to hold the relay in a selected position, said operating coil being energized in common through all the output leads from the coincidence circuits of the decades so that when all said coincidence circuits are biased off coincidently the relay will move out of said selected position.

6. In an electronic device including a plurality of decades arranged in successive order each decade comprising a ring-of-five circuit, a scale-of-two circuit associated with each ring-of-five circuit, a coincidence circuit associated with each decade having an output lead and a control element so arranged that the coincidence circuit will transmit electrical current to its output lead as long as the potential of the control element is in excess of a predetermined cut-off potential, a discriminating circuit having an input lead from the scale-of-two circuit and an output lead to the ring-of-five circuit of the next successive decade, an isolating network associated with each decade having opposite input leads and an output lead connected to the control element of the coincidence circuit, and ten switches each of said switches having two separate current paths therethrough respectively connected to the input leads of the isolating network, one of said paths in each switch being also connected to the scale-of-two circuit and the other path being connected to the ring-of-five circuit, said switches being interconnected so that only one of them can be "on" at one time whereby to cause the isolating network to impose upon the control element of the coincidence circuit a potential substantially below the cut-off potential thereof responsive to a predetermined count.

7. An electronic device comprising a sensory circuit capable of emitting an electric current directly proportional to an observed physical phenomenon, a pulse generator adapted to emit a series of discrete electrical impulses related to each other in terms of time so as to be directly proportional to the integral of the observed physical phenomenon producing the electrical current emitted by the sensory device, a counting circuit consisting of a plurality of decades, each decade including a ring-of-five circuit and a scale-of-two circuit interconnected for emitting an electrical impulse responsive to every tenth impulse received from the pulse generator, a coincidence circuit associated with each decade, ten switches associated with each decade and being interconnected so that only one switch can be "on" at any one time, each of said switches being so arranged as to transmit an impulse responsive to a selected incoming impulse from the pulse generator, and an isolating network adapted for receiving the impulse from the selected switch and imposing such impulse upon the coincidence circuit.

8. An electronic device comprising a sensory circuit capable of emitting an electric current directly proportional to an observed physical phenomenon, a pulse generator adapted to emit an electrical impulse each time a predetermined quantity of electric current is fed into it from the sensory device, a counting circuit consisting of a plurality of decades, each decade including a ring-of-five circuit and a scale-of-two circuit interconnected for emitting an electrical impulse responsive to every tenth impulse received from the pulse generator, a coincidence circuit associated with each decade, ten switches associated with each decade and being interconnected so that only one switch can be "on" at any one time, each of said switches being so arranged as to simultaneously transmit current from the ring-of-five circuit and scale-of-two circuit responsive to a selected incoming impulse from the pulse generator, an isolating network adapted for simultaneously receiving the current transmitted by said selected switch, means in the isolating network for generating a resultant potential responsive to the imposed potential received from the selected switch, and in turn imposing such generated potential upon the coincidence circuit.

9. An electronic instrument comprising a sensory circuit capable of continuously emitting an electric current instantaneously and directly proportional to an observed physical phenomenon, a pulse generator adapted to emit an electrical impulse each time a predetermined quantity of electrical current is fed into it from the sensory device, a plurality of interconnected counting decades each counting decade consisting of a ring-of-five and scale-of-two circuit adapted to emit an electrical impulse responsive to every tenth impulse received from the pulse generator, a coincidence circuit associated with each decade counting circuit, said coincidence circuit comprising a triode tube having a cathode plate and grid, a control relay adapted to respond to the counting circuit in a predetermined manner, said control relay being connected to the plate of each coincidence circuit in each decade, ten switches associated with each decade, said switches being interconnected so that only one of them may be "on" at any one time, each of said switches being adapted when "on" to simultaneously transmit current from the ring-of-five circuit and scale-of-two circuit responsive to selected incoming impulses from the pulse generator to the exclusion of other incoming impulses, an isolating network connected to the switches and arranged to transmit current responsive to the currents simultaneously received from the selected switch which is in "on" position when the device is operating, said isolating network being also connected to the grid of the coincidence circuit associated with its particular decade for imposing a potential upon the grid responsive to the currents received from the particular switch which is in "on" position, and being adapted to cause said tube to cut-off responsive to one unique impulse out of every series of ten impulses received by such decade from the pulse generator.

10. In a device of the character described a counting circuit consisting of five individual trigger circuits successively connected so that the input sides of each circuit are connected in common to a common input lead, an output lead from each trigger circuit connected to the next successive trigger circuit so that the five trigger circuits are connected in a continuous ring and are adapted to successively condition each other for the transmittal of a conditioning impulse into the successive trigger circuit whereby the first impulse appearing on the common input lead will invert the first trigger circuit and will cause it to transmit a conditioning impulse into the next successive trigger circuit so that such next successive trigger circuit will be affected by the second impulse appearing on the common input lead, an independent trigger circuit connected to the fifth one of the above named trigger circuits and adapted to receive the output impulse therefrom so as to be inverted by the first such impulse received and adapted to transmit an output impulse responsive to the second impulse thus received whereby the independent trigger circuit will transmit an output impulse responsive to every tenth impulse appearing on the common input lead, and ten single throw double pole switches associated with the ring-of-five circuit, said switches being paired so that one pole in each of the paired switches is connected by a common lead to the output side of one selected trigger circuit and thus each pair of switches will be thereby associated with a different one of the five trigger circuits in the ring-of-five circuits the other poles of each pair of switches being respectively connected to the opposite side of the independent trigger circuit, means for interconnecting said switches so that only one of them may be "on" at any one time, an isolating network connected across every one of said switches so that the current from one selected trigger circuit in the ring-of-five and the current from the independent trigger circuit will be simultaneously imposed upon opposite sides of the isolating network, an output line from the isolating network, a coincidence tube having a grid connected to the output line from the isolating network, said coincidence tube being adapted to transmit current at all times when the grid thereof has a potential in excess of a predetermined cut-off potential established for such coincidence tube and being adapted to cut-off when the potential imposed on the grid by the isolating network is below such established cut-off potential, and means connected to the coincidence tube actuable responsive to the cutting-off of said coincidence tube.

11. In a decade counter consisting of a ring-of-five circuit and a scale-of-two circuit the provision of direct presetting to a desired number which comprises a relay adapted to be actuated by the counter, said relay having one terminal connected directly to ground, a source of operating potential having two terminals one of which is also connected to ground, a coincidence tube having a grid, a plate, and a cathode, said plate being connected to the other terminal of the relay and said cathode being connected to the other terminal of the source of potential, ten double pole single throw selector switches each having first and second input poles and first and second output poles, said switches being paired by the interconnection in common of the first input pole of each switch in such pair and the common connection in turn of such first input poles to the output side of one of the tubes in the ring-of-five circuit each pair of switches being thus connected to a different one of the five tubes in the ring-of-five circuit, an isolating network having one side connected in common to all of the first output poles of all ten switches and its other side connected in common to all of the second output poles of all of the ten switches, said isolating network having an electrical center point which is connected to the grid of the coincidence tube, and means for interconnecting all ten switches so that only one of them can be in "on" position at any one time, the second input pole of one pair of switches being connected to one side of the scale-of-two and the other second input pole of the other switch in each pair being connected to the other side of the scale-of-two circuit so that when any selected switch is placed in "on" position it will simultaneously impose upon the isolating network a potential from the scale-of-two circuit and a potential from one of the tubes in the ring-of-five circuit, such potentials respectively being adapted to change sharply as such tubes in the ring-of-five circuit and the scale-of-two circuit invert.

12. In a device of the character described, an electronic integrating circuit comprising a condenser adapted to continuously receive incoming electrical current and store up such current, a gas diode and a thyratron operatively connected to the condenser, said gas diode being also connected to the grid of the thyratron so that when the diode fires the potential transmitted thereby will be imposed on the thyratron grid, causing the thyratron in turn to fire and thus discharge the condenser when the stored current reaches a predetermined value, said thyratron thereupon emitting a negative pulse responsive to such discharge so that each emitted negative pulse will be precisely a measure of a predetermined quantity of electrical current flowing into the condenser irrespective of the length of time required for the condenser to reach the predetermined value at which it is discharged.

13. For use with a sensory device capable of emitting an electric current responsive to an observed physical phenomenon, an electronic integrator comprising a capacitor adapted to receive a charging current impressed upon it by said sensory device, a gas diode connected across the capacitor and having a predetermined ignition potential at which it will initiate discharge of the capacitor, and a thyratron having a plate and cathode respectively connected across the capacitor and having a grid capacitatively connected to one side of the diode so that the diode will fire when the charge in the capacitor reaches said ignition potential and will in turn cause the thyratron to fire, discharging the capacitor, said thyratron having an extinction potential such that it will terminate the discharge of the capacitor substantially at zero potential.

14. For use with a sensory device capable of emitting an electric current responsive to an observed physical phenomenon, an electronic integrator comprising a capacitor adapted to receive a charging current impressed upon it by said sensory device, a gas diode connected across the capacitor and having a predetermined ignition potential at which it will initiate discharge of the capacitor, and a thyratron having a plate and cathode respectively connected across the capacitor and having a grid capacitatively connected to one side of the diode so that the diode will fire when the charge in the capacitor reaches said ignition potential and will in turn cause the thyratron to fire, discharging the capacitor, said thyratron having an extinction potential such that it will terminate the discharge of the capacitor substantially at zero potential, said extinction potential of the thyratron being lower than the extinction potential of the gas diode.

15. For use wih a sensory device capable of emitting an electric current responsive to an observed physical phenomenon, an electronic integrator comprising a capacitor adapted to receive a charging current impressed upon it by said sensory device, a gas diode connected across the capacitor and having a predetermined ignition potential at which it will initiate discharge of the capacitor, and a grid-controlled gas discharge tube having a plate and cathode respectively connected across the capacitor and having a grid capacitatively connected to one side of the diode so that the diode will fire when the charge in the capacitor reaches said ignition potential and will in turn cause the thyratron to fire, discharging the capacitor, said thyratron having the characteristic that its extinction potential is reproducible with substantial uniformity in each of its successive operations.

16. An electronic instrument comprising a sensory device capable of continuously emitting an electric current instantaneously and directly proportional to an observed physical phenomenon, and a pulse generator adapted to emit an electrical impulse each time a predetermined quantity of said electrical current is fed into it from the sensory device, said pulse generator comprising a capacitor circuit, a gas diode connected across the capacitor circuit, a thyratron also connected across the capacitor circuit, said gas diode being also connected to the grid of the thyratron so that when the diode fires the potential transmitted thereby will be imposed on the thyratron grid, causing the thyratron in turn to fire and thus discharge the capacitor circuit when a predetermined quantity of electrical current is stored in the capacitor circuit, said thyratron thereupon transmitting a single output pulse at the time of such discharge, and a double triode having one grid connected to the thyratron for receiving the output impulse therefrom and being adapted for extending the duration of said output impulse.

17. For use with a sensory device capable of emitting an electric current responsive to an observed physical phenomenon, an electronic integrator comprising a capacitor adapted to receive a charging current impressed upon it by said sensory device, a gas diode connected across the capacitor and having a predetermined ignition potential at which it will initiate discharge of the capacitor, a thyratron having a grid capacitatively connected to one side of the diode so that the diode will fire when the charge in the capacitor reaches said ignition potential and will in turn cause the thyratron to fire, discharging the capacitor, said thyratron having an extinction potential such that the discharge of the capacitor will be terminated substantially at zero potential, said thyratron having its plate connected to one side of the capacitor and its cathode connected to one side of a resistor, the other side of said resistor being connected to the other side of the capacitor, and a double triode having one grid capacitively coupled to the thyratron-capacitor circuit between the resistor and the capacitor, for emitting a negative impulse responsive to discharge of the capacitor, the duration of which negative impulse is extended in relation to the discharge-time of the capacitor.

18. An electronic instrument comprising a plurality of identical counter-decades, each decade including a ring-of-five and scale-of-two circuit, said decades being arranged in successive ascending orders of tens, an interdecade transfer circuit interposed between the successive decades so that every tenth impulse entering the units decade will be transmitted into the tens decade and every tenth impulse coming into the tens decade will be transmitted into the hundreds decade and so on in powers of ten to the highest decade, a switching circuit in each decade, said switching circuit comprising ten switches corresponding respectively to the integers from zero to nine, an isolating network having input leads and an output lead, said switches being connected across the ring-of-five and scale-of-two circuit and the input lead of the isolating network in such a manner that when a switch corresponding to a selected integer is closed an output signal will appear upon the output lead of the isolating network every time the ring-of-five and scale-of-two circuit receives an input pulse corresponding to said integer in the sequence of counting, a coincidence circuit in each decade, said coincidence circuit having an output lead and an input lead, the input lead of the coincidence circuit being connected to a source of current supply and the coincidence circuit being adapted normally to pass current through to the output lead continuously while the counter is in operation, a control element in each coincidence circuit of each decade connected to the output lead of the isolating network in that decade and arranged so that when an impulse appears on the output lead of the isolating network the coincidence circuit will momentarily become non-conducting so that the passage of current to the output lead of such coincidence circuit will be interrupted, a relay having an actuating coil connected in common to all of the output leads of the several coincidence circuits of the several decades so that said actuating coil will be energized when any one or more of the coincidence circuits is in conducting condition and correspondingly will become de-energized only when all of the coincidence circuits simultaneously become non-conducting, and means operatively connected to the relay producing a desired result responsive to de-energization of the relay-actuating coil.

19. An electronic instrument comprising a plurality of counter-decades, each decade including a ring-of-five circuit, a scale-of-two circuit, a coincidence circuit having an output lead and a switching circuit also having an output lead, said coincidence circuit being connected to a source of current supply and being adapted normally to conduct current continuously to its output lead while the counter is in operation, said switching circuit being connected to the ring-of-five and scale-of-two circuits in such a manner as to produce a unique impulse upon its output lead responsive to a pre-selected count, each coincidence circuit in each decade having a control element connected to the output lead of the switching circuit in such decade, said control element being arranged to render the coincidence circuit non-conducting when an impulse appears on the output lead of the switching circuit and hold the coincidence circuit in non-conducting condition until the next count appears in the ring-of-five circuit, and a relay having an actuating coil connected on one side to a source of current and on its other side in common to all the output leads from all the coincidence circuits in several decades in such manner that the actuating coil will be energized when any one or more of the coincidence circuits is conducting and will correspondingly become de-energized only when all of the coincidence circuits are simultaneously in non-conducting condition.

PHILIP GILBERT.

References Cited in the file of this patent

UNITED STATES PATENTS

| Number | Name | Date |
|---|---|---|
| 2,176,932 | Smith | Oct. 24, 1939 |
| 2,284,101 | Robins | May 26, 1942 |
| 2,354,768 | Nokes | Aug. 1, 1944 |
| 2,411,573 | Holst et al. | Nov. 26, 1946 |
| 2,512,851 | Crosman | June 27, 1950 |
| 2,519,184 | Grosdoff | Aug. 15, 1950 |
| 2,521,774 | Bliss | Sept. 12, 1950 |
| 2,547,511 | Weissman | Apr. 3, 1951 |
| 2,575,951 | Gilbert | Nov. 20, 1951 |

OTHER REFERENCES

Electronic Counters, I. E. Grosdoff: "R. C. A. Review"; September 1946; vol. VII, No. 13; pages 438–447.

Predetermined Counter; R. J. Blume: "Electronics"; February 1948; pages 88–93.

Video Program Recording; Gillette et al.: "Electronics"; October 1950; pages 90–95.

"Reference Data for Radio Engineers"; Federal Telephone and Radio Corp., New York, N. Y., 1949; page 270, Fig. 22.